United States Patent
Adachi et al.

(10) Patent No.: US 6,652,917 B2
(45) Date of Patent: Nov. 25, 2003

(54) POWDER TOPCOATING WITH EPOXY RESIN, NON-CYCLIC POLYANHYDRIDE, AND ALIPHATIC NON-CYCLIC ANHYDRIDE OR DIBASIC ACID

(75) Inventors: Takato Adachi, Hiratsuka (JP); Ichiro Yoshihara, Fujisawa (JP); Yugen Kawamoto, Hiratsuka (JP)

(73) Assignee: Kansai Paint Co., Ltd., Amagasaki (JP)

( * ) Notice: Subject to any disclaimer, the term of this patent is extended or adjusted under 35 U.S.C. 154(b) by 17 days.

(21) Appl. No.: 10/127,767

(22) Filed: Apr. 23, 2002

(65) Prior Publication Data

US 2003/0027939 A1 Feb. 6, 2003

Related U.S. Application Data

(62) Division of application No. 09/588,349, filed on Jun. 7, 2000, now Pat. No. 6,448,345.

(30) Foreign Application Priority Data

Jun. 8, 1999 (JP) ............................................. 11-161604

(51) Int. Cl.$^7$ .............................. B05D 1/36; B05D 3/02; C08L 33/14; C08L 63/02; C08L 73/02
(52) U.S. Cl. ........................ 427/386; 427/410; 525/186; 525/449
(58) Field of Search ................................. 525/186, 449; 427/386, 410

(56) References Cited

U.S. PATENT DOCUMENTS

| 5,609,960 A | 3/1997 | Kasari et al. ............... 428/413 |
| 5,728,790 A | 3/1998 | Seki et al. .................. 526/273 |

*Primary Examiner*—Robert E. L. Sellers
(74) *Attorney, Agent, or Firm*—Armstrong, Westerman & Hattori, LLP

(57) ABSTRACT

The present invention provides a method for forming a topcoat according to a 2-coat 1-bake system comprising the steps of applying to a substrate a thermosetting aqueous colored base coating composition, applying to the uncured surface of the base coat a clear coating composition, and curing the two coats by heating, wherein the clear coating composition is a thermosetting powder coating composition comprising: (A) an epoxy-containing resin; and (B) a curing agent containing acid anhydride (a) represented by formula $$X-COO-[CO-(CH_2)_m-COO]_n-CO-X \qquad (1)$$

and at least one species selected from the group consisting of acid anhydride (b) represented by the formula $$HO-[CO-(CH_2)_p-COO]_q-H \qquad (2)$$

and dibasic acid (c).

1 Claim, No Drawings

POWDER TOPCOATING WITH EPOXY RESIN, NON-CYCLIC POLYANHYDRIDE, AND ALIPHATIC NON-CYCLIC ANHYDRIDE OR DIBASIC ACID

This application is a Divisional of prior application Ser. No. 09/588,349 filed Jun. 7, 2000, U.S. Pat. No. 6,448,345 which is hereby incorporated by reference.

The present invention relates to a novel thermosetting powder coating composition and a method for forming a topcoat using the same.

Topcoats for coating substrates such as automotive exterior panels are required to have excellent finished appearance such as surface smoothness and excellent coating properties such as weather resistance, solvent resistance, acid resistance, etc., in view of uses. In recent years, the required levels have been getting even higher.

Thermosetting powder coating compositions are conventionally used as clear coating compositions for forming topcoats by 2-coat 1-bake systems, etc. It is desired that the thermosetting aqueous coating compositions be used as base coating compositions, from the viewpoints of environmental protection and energy saving.

However, the thermosetting powder coating compositions have the following problems. When surface smoothness of the coating film is improved, other properties such as weather resistance, solvent resistance and acid resistance are impaired. On the other hand, when the other properties are improved, surface smoothness is reduced. It has been difficult to achieve a proper balance therebetween. When conventional thermosetting powder clear coating compositions are applied to surfaces of aqueous base coats, such problems develop to a serious level, and it has been difficult to form a topcoat that excels in both surface smoothness and the above-mentioned other coating properties.

For example, a 2-coat 1-bake coating method for forming a topcoat is known from U.S. Pat. No. 5,585,146. This method comprises the steps of applying to a substrate a thermosetting aqueous base coating composition comprising a hydroxyl- and carboxyl-containing resin and an alkyletherified methylol melamine resin, applying to the uncured surface of the base coat a thermosetting powder clear coating composition comprising an epoxy-containing acrylic resin, and a dibasic acid such as dodecanoic diacid or acid anhydride thereof as a curing agent, and curing the two coats by heating.

However, in the above 2-coat 1-bake coating method, when the coat of the aqueous base coating composition and the coat of the powder clear coating composition are heated for curing at the same time, a reaction between the hydroxyl group and the alkylether group in the aqueous coat produces an alcohol as a byproduct. When the alcohol evaporates out through the thermally fused powder coat, it causes cratering due to popping on the surface of powder coat, thereby impairing surface smoothness, distinctness-of-image gloss, and physical properties of the coating film. When the aqueous coat comprises a flaky metallic pigment, orientation of the pigment flakes is altered, thus impairing metallic effects, etc.

In this case, if curing initiation time is delayed so as to fully melt and flow the powder coat particles by heating with the purpose of improving coating surface smoothness, etc., an insufficiently crosslinked powder coat will result, thus impairing coating properties such as weather resistance, solvent resistance and acid resistance.

An object of the present invention is to provide a novel thermosetting powder coating composition that excels in finished appearance such as surface smoothness and also in other coating properties such as weather resistance, solvent resistance and acid resistance.

Another object of the invention is to provide a method for forming a topcoat using the above-mentioned thermosetting powder coating composition.

Other objects and features of the invention will become apparent from the following description.

The present inventors carried out intensive research to overcome the prior art defects and found that the above objects can be achieved with a thermosetting powder coating composition comprising an epoxy-containing resin and a curing agent for the resin containing a specific acid anhydride as an essential ingredient. More specifically, the present inventors found that the above-mentioned powder coating composition is excellent in curability, and when it is used as a clear coating composition in a 2-coat 1-bake coating method using an aqueous base coating composition, a fully crosslinked powder coat will be formed even with the curing initiation time being delayed, thus preventing popping and providing a topcoat with excellent finished appearance such as smoothness and excellent coating properties such as weather resistance, solvent resistance and acid resistance. The present invention has been accomplished based on this novel finding.

The present invention provides a thermosetting powder coating composition comprising:

(A) an epoxy-containing resin; and
(B) a curing agent containing acid anhydride (a) and at least one species selected from the group consisting of acid anhydride (b) and dibasic acid (c),
the acid anhydride (a) being represented by formula

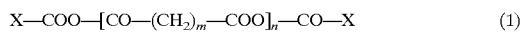   (1)

wherein the two X's are the same or different and independently represent a $C_{4-12}$ alkyl group having a branched structure, $R_1$—O—CO—$R_2$—, $R_1$—CO—$R_2$— or $R_1$—CO—NH—$R_2$— in which $R_1$ is a $C_{1-10}$ monovalent saturated hydrocarbon group; $R_2$ is a $C_{1-10}$ bivalent saturated hydrocarbon group; m is an integer of 6 to 18; and n is an integer of 8 to 50,
the acid anhydride (b) being represented by the formula

   (2)

wherein p is an integer of 6 to 18 and q is an integer of 2 to 18, and having carboxyl groups at both ends,
the dibasic acid (c) being represented by the formula

   (3)

wherein t is an integer of 6 to 18,
the molar ratio of carboxyl groups to acid anhydride groups in the curing agent being in the range between 0.15:1 and 2:1, and
the molar ratio of the total of carboxyl groups and acid anhydride groups in the curing agent (B) to epoxy groups in the epoxy-containing resin (A) being in the range between 0.7:1 and 1.2:1.

The present invention further provides a method for forming a topcoat according to a 2-coat 1-bake system comprising the steps of applying to a substrate a thermosetting aqueous colored base coating composition, applying to the uncured surface of the base coat a clear coating composition, and curing the two coats by heating, wherein the clear coating composition is the above-mentioned thermosetting powder coating composition.

The epoxy-containing resin (A) of the thermosetting powder coating composition according to the invention may be any conventionally known resin that is solid and contains at least one epoxy group, preferably at least two epoxy groups, on average per molecule.

Examples of resins usable as the epoxy-containing resin (A) are bisphenol epoxy resins such as "EPIKOTE 1001" (with an epoxy equivalent of 450 to 500, product of Shell Chemical Co., Ltd., trade name), "EPIKOTE 1004" (with an epoxy equivalent of 875 to 975, product of Shell Chemical Co., Ltd., trade name), and "EPIKOTE 1007" (with an epoxy equivalent of 1,750 to 2,200, Shell Chemical Co., Ltd., trade name); and epoxy-containing copolymers each prepared by copolymerizing an epoxy-containing vinyl monomer and at least one other polymerizable vinyl monomer.

Examples of epoxy-containing vinyl monomers used in the epoxy-containing copolymers include glycidyl (meth) acrylate, allyl glycidyl ether, 3,4-epoxycyclohexyl (meth) acrylate and β-methylglycidyl (meth)acrylate. The monomers can be used singly or in combination of two or more. Particularly preferred are glycidyl (meth)acrylate and β-methylglycidyl (meth)acrylate.

Examples of other polymerizable vinyl monomers are vinyl aromatic compounds such as styrene, α-methylstyrene, vinyltoluene and α-chlorostyrene; and $C_{1-24}$ alkyl esters or cycloalkyl esters of acrylic or methacrylic acids, such as methyl (meth)acrylate, ethyl (meth) acrylate, n-butyl (meth)acrylate, isobutyl (meth)acrylate, t-butyl (meth)acrylate, 2-ethylhexyl (meth)acrylate, n-octyl (meth)acrylate, decyl (meth)acrylate, lauryl (meth)acrylate, stearyl (meth)acrylate, cyclohexyl (meth)acrylate, isobornyl (meth)acrylate and tricyclodecanyl (meth)acrylate.

Of the monomers constituting the epoxy-containing copolymer, the epoxy-containing vinyl monomer is used preferably in a proportion of 20 to 50% by weight, more preferably in a proportion of 25 to 40% by weight. An epoxy-containing vinyl monomer content of less than 20 wt. % in the copolymer reduces acid resistance, weather resistance and solvent resistance of the coating film. On the other hand, an epoxy-containing vinyl monomer content of more than 50 wt. % impairs storage stability of the coating composition and finished appearance such as surface smoothness of the coating film. Therefore, any epoxy-containing vinyl monomer content outside said range is undesirable.

It is preferable for the epoxy-containing resin (A) to have a glass transition temperature of 40 to 80° C., particularly 50 to 70° C. A glass transition temperature of lower than 40° C. causes particles in the powder coating composition to weld together, thereby reducing blocking resistance. On the other hand, a glass transition temperature of higher than 80° C. increases the viscosity of the powder coating composition when fused, thus impairing finished appearance of the coating film. Therefore, any glass transition temperature outside said range is undesirable. The glass transition temperature can be measured by DSC. (differential scanning calorimeter).

It is preferable for the epoxy-containing resin (A) to have a number average molecular weight of 1,000 to 10,000, particularly 2,000 to 6,000. A number average molecular weight of less than 1,000 reduces blocking resistance of the powder coating composition and impairs coating properties such as solvent resistance and acid resistance. On the other hand, a number average molecular weight of more than 10,000 impairs finished appearances such as surface smoothness of the coating film. Therefore, any epoxy-containing resin having a number average molecular weight outside said range is undesirable.

The curing agent (B) comprises, as an essential curing component, acid anhydride (a) of the formula (1), and further comprises at least one species selected from the group consisting of acid anhydride (b) of the formula (2) having carboxyl groups at both ends and dibasic acid (c) of the formula (3), the molar ratio of carboxyl groups to acid anhydride groups in the curing agent being in the range between 0.15:1 and 2:1.

The molar ratio of carboxyl groups to acid anhydride groups in the curing agent (B) should be in the range between 0.15:1 and 2:1, preferably the range between 0.2:1 and 1.8:1. When the carboxyl group/acid anhydride group molar ratio is lower than 0.15, satisfactory curability is not provided. When the carboxyl group/acid anhydride group molar ratio is higher than 2.0, the curing initiation time occurs earlier, thus causing popping on the coating film and impairing surface smoothness of the coating film. Therefore, any molar ratio outside said range is undesirable.

The molar proportion of acid anhydride groups in acid anhydride (a) to the total of carboxyl groups and acid anhydride groups in the curing agent (B) is preferably 30 to 70 mole %, more preferably 40 to 60 mole %. If the proportion is lower than 30 mole %, the curing initiation time occurs earlier, thus causing popping on the coating film and impairing surface smoothness of the coating film. On the other hand, if the proportion is higher than 70 mole %, satisfactory curability is not provided, thus impairing coating properties such as acid resistance and solvent resistance. Therefore, any molar proportion outside said range is undesirable.

In the formula (1), examples of $C_{4-12}$ alkyl groups each having a branched structure include 2-ethylhexyl, 3,5,5-trimethylhexyl, neopentyl, neodecanyl or the like. Examples of $C_{1-10}$ monovalent saturated hydrocarbon groups represented by $R_1$ include a monovalent aliphatic hydrocarbon group, a monovalent alicyclic hydrocarbon group and a combination thereof. Specific examples are methyl, ethyl, n-propyl, n-butyl, n-hexyl, cyclohexyl, n-octyl, n-decanyl and the like. Examples of $C_{1-10}$ bivalent saturated hydrocarbon groups represented by $R_2$ include a bivalent aliphatic hydrocarbon group, a bivalent alicyclic hydrocarbon group and a combination thereof. Specific examples are methylene, ethylene, n-propylene, n-butylene, n-hexylene, cyclohexylene, n-octamethylene, n-nonamethylene, n-decamethylene and the like.

In the formula (1), m should be an integer of 6 to 18. When m is less than 6, the coating composition is cured too quickly, giving inferior finished appearance. On the other hand, if m is more than 20, the cured coat will have low crosslinking density, thus impairing coating properties such as acid resistance and solvent resistance. Therefore, any integer outside said range is undesirable.

The acid anhydride (a) of the formula (1) can be prepared by conventionally known methods. For example, the compound can be obtained by heating a dibasic acid and at least one monobasic acid selected from the group consisting of a monobasic acid having a branched structure, an ester bond-containing monobasic acid, a ketone bond-containing monobasic acid and an amide-containing monobasic acid, in the presence of acetic anhydride. The compound can also be prepared by a method comprising heating dibasic acid in the presence of acetic anhydride, and monoesterifying part of the acid anhydride groups of the intermediate with an alcohol, followed by further heating the intermediate in the presence of acetic anhydride, thus giving acid anhydride having ester groups at both ends. Examples of alcohols used in the reaction are methanol, ethanol, iso-propanol and the like.

Examples of dibasic acids are aliphatic dibasic acids such as suberic acid, azelaic acid, sebacic acid, undecane diacid, dodecane diacid, tridecane diacid, tetradecane diacid, pentadecane diacid and eicosane diacid.

Examples of monobasic acids as terminal groups are monobasic acids having $C_{4-12}$ alkyl groups of a branched structure, such as isooctanoic acid, di-n-propionic acid, isononanoic acid and 2-ethylhexanoic acid; monobasic acids having ester groups, such as monopropyl succinate, monobutyl succinate, mono-2-ethylhexyl succinate, mono-n-octyl succinate, monomethyl hexahydrophthalate, monoethyl hexahydrophthalate, monopropyl hexahydrophthalate and monobutyl hexahydrophthalate; monobasic acids having ketone groups, such as levulinic acid; and monobasic acids having amide groups such as acetoamidoundecanoic acid and butylamidoundecanoic acid.

In the formula (1), the group represented by X preferably has a molecular weight of 55 to 230, more preferably 70 to 210. If the group X has a molecular weight of less than 55, unreacted monobacid acid as a starting material distills off under reduced pressure during the synthesis of acid anhydride (a) and it becomes difficult to obtain the desired acid anhydride. Furthermore, when a powder coating composition comprising such a curing agent is baked, a large amount of decomposed monobasic acid volatilizes and accumulates in baking furnaces, filters, etc., thereby damaging the equipment. On the other hand, if the group X has a molecular weight of more than 230, the cured coat of the powder coating composition comprising such an curing agent becomes too soft, resulting in low hardness and has low polarity, resulting in low resistance to solvents such as gasoline and xylene. Therefore, any molecular weight outside said range is undesirable.

The monobasic acid represented by X-COOH forming the terminal group X in the formula (1) preferably has a boiling point of 200° C. or higher, more preferably 220° C. or higher. If the boiling point is lower than 200° C., unreacted monobasic acid as a starting material distills off under reduced pressure during the synthesis of acid anhydride (a) and it becomes difficult to obtain the desired acid anhydride. Furthermore, when a powder coating composition comprising such a curing agent is baked, a large amount of decomposed monobasic acid volatilizes and accumulates in baking furnaces, filters, etc., thereby damaging the equipment. Therefore, any boiling point lower than 200° C. is undesirable.

In the formula (1), n represents degree of polymerization. The polymerization degree can be controlled by changing the feeding ratio of dibasic acid to monobasic acid or the feeding ratio of dibasic acid to alcohol. It is necessary that n be an integer of 8 to 50, preferably an integer of 10 to 45. If n is less than 8, the proportion of monobasic anhydride increases, providing a powder coating composition with low curability. On the other hand, if n is more than 50, the viscosity of the powder coating composition increases when thermally fused, providing a coating film with inferior finished appearance such as low surface smoothness. Hence any degree of polymerization outside said range is undesirable.

Preferably used as acid anhydride (b) of the formula (2) in the curing agent (B) of the invention are acid anhydrides prepared by heating aliphatic dibasic acids such as suberic acid, azelaic acid, sebacic acid, undecane diacid, dodecane diacid, tridecane diacid, tetradecane diacid, pentadecane diacid, eicosane diacid and the like in the presence of acetic anhydride.

In the formula (2), p is an integer of 6 to 18. If p is 5 or less, the curing initiation time occurs earlier, giving inferior finished appearance. On the other hand, if p is 19 or more, the cured coat will have low crosslinking density, impairing coating properties such as acid resistance and solvent resistance. Therefore, any integer outside said range is undesirable. In the formula (2), q represents the degree of polymerization, and is an integer of 2 to 18, preferably an integer of 3 to 15. If q is more than 18, the viscosity of the powder coating composition increases when thermally fused, thus providing a coating film with inferior finished appearance such as low surface smoothness. Hence any degree of polymerization outside said range is undesirable.

Preferably used as dibasic acid (c) of the formula (3) in the curing agent (B) of the invention are aliphatic dibasic acids such as suberic acid, azelaic acid, sebacic acid, undecanoic diacid, dodecanoic diacid, tridecanoic diacid, tetradecanoic diacid, pentadecanoic diacid and eicosane diacid. In the formula (3), r is an integer of 6 to 18. If r is 5 or less, the curing initiation time occurs earlier, giving inferior finished appearance. On the other hand, if r is 19 or more, the cured coat will have low crosslinking density, thus impairing coating properties such as acid resistance and solvent resistance. Therefore, any integer outside said range is undesirable.

The thermosetting powder coating composition of the invention comprises an epoxy-containing resin (A) and a curing agent (B) as essential components. The curing agent (B) essentially comprises acid anhydride (a) in combination with acid anhydride (b) and/or dibasic acid (c).

It is necessary that the molar ratio of the total of carboxyl groups and acid anhydride groups in the curing agent (B) to epoxy groups in the epoxy-containing resin (A) be in the range between 0.7:1 and 1.2:1. If the molar ratio of the total of carboxyl groups and acid anhydride groups in the curing agent (B)/epoxy groups in the resin (A) is lower than 0.7, coating properties such as acid resistance and solvent resistance will be impaired. On the other hand, if the molar ratio is more than 1.2, inferior finished appearance such as low surface smoothness will result. Therefore, any molar ratio outside said range is undesirable.

It is preferable for acid anhydride (a), acid anhydride (b) and dibasic acid (c) in the curing agent (B) of the invention to have melting points of 70° C. or higher, more preferably 75° C. or higher. If the melting points are lower than 70° C., the powder coating composition will have poor blocking resistance, thus being undesirable.

The thermosetting powder coating composition of the invention may contain additives, for example, antipopping agents, surface modifiers, oxidation inhibitors, UV absorbers, UV stabilizers, antiblocking agents, fluidity modifiers, antistatic agents, coloring pigments, metallic pigments, interference pigments, fillers and curing accelerators.

The thermosetting powder coating composition of the invention can be prepared by conventional methods, without limitation. For example, a typical method comprises dry-blending an epoxy-containing resin (A), a curing agent (B) and optionally other components in a mixer or the like, and melting and kneading the dryblend with heating, followed by cooling, coarse grinding, fine grinding and sieving.

The thermosetting powder coating composition of the invention may be used as a thermosetting clear powder coating composition or as a thermosetting colored powder coating composition comprising at least one pigment selected from coloring pigments, metallic pigments and interference pigments in the clear powder coating composition. The thermosetting clear powder coating composition may contain such pigments in any amount that the under coat can be seen through or substantially can not be seen through the under coat.

The thermosetting powder coating composition of the invention is applied to a substrate by powder coating and baked to form a cured coating film. It is preferable that the baking be conducted at a temperature of about 120 to about 180° C. for about 10 to about 50 minutes.

The substrate to be coated may be any of known substrates that can be coated in a powder coating operation. Examples of useful substrates are metals, surface-treated metals, plastics, or coated these materials.

The powder coating operation can be carried out by conventional methods, for example, preferably electrostatic powder coating methods or frictionally electrified powder coating methods. There is no limitation on the coating film thickness. However, it is preferable for the obtained film to have a coating thickness of about 20 to about 1,000 µm, more preferably about 20 to about 80 µm.

The thermosetting powder coating composition of the invention can be used for vehicles such as automobiles, electric appliances, steel furniture, office equipment and stationery, construction materials and the like where conventional powder coating compositions are used. Particularly, the thermosetting powder coating composition of the invention is suitable for automotive exterior panels or interior panels where high surface smoothness is required of the coating film.

Described below is a method for forming a topcoat on the surface of vehicles or the like, using the thermosetting powder coating composition of the invention.

The method for forming a topcoat using the present invention may be a 1-coat system or a 2-coat system. The 1-coat system comprises applying the thermosetting powder coating composition of the invention to metallic or plastic substrates for vehicles or the like, or to the metallic or plastic substrates coated with a primer such as a cationic electrocoating composition and optionally coated with an intercoat. The 2-coat system comprises applying a colored base coating composition to the substrates and applying the thermosetting powder clear coating composition of the invention to the coated substrate.

The thermosetting powder coating composition of the present invention produces particularly remarkable effects, when used as a clear coating composition in the method for forming a topcoat according to a 2-coat 1-bake system, which comprises applying a thermosetting aqueous colored base coating composition to a substrate, applying a clear coating composition to the uncured surface of the base coat, and curing the two coats by heating.

Examples of thermosetting aqueous colored base coating compositions preferably used are aqueous colored coating compositions, aqueous metallic coating compositions, aqueous interference pattern coating compositions, aqueous colored metallic coating compositions and aqueous colored interference pattern coating compositions.

According to the 2-coat 1-bake coating method of the invention, a desirable topcoat can be formed by the method comprising the following steps:

i) applying an aqueous colored base coating composition having a solids content of 10 to 60 wt. % (when applied) to the substrate to a coating thickness of about 10 to about 60 µm, preferably about 10 to about 40 µm, when cured, by spray coating such as airless spray coating, air spray coating or electrostatic coating;

ii) allowing the coated substrate to stand at room temperature for about 1 to about 10 minutes or drying the coated substrate at about 50 to about 100° C. for about 1 to about 10 minutes;

iii) applying the thermosetting powder clear coating composition according to the invention to the uncured surface of the base coat to a coating thickness of about 20 to about 100 µm, more preferably about 20 to about 80 µm, when cured, by powder coating such as electrostatic powder coating or frictionally electrified powder coating; and iv) curing the two coats (base coat and clear coat) at the same time by heating at about 120 to about 180° C. for about 10 to about 50 minutes.

The aqueous colored base coating composition may be selected from the conventional aqueous colored base coating composition for vehicles, etc. without limitation, of which melamine-curing aqueous colored base coating compositions are particularly preferred.

Preferably, the melamine-curing aqueous colored base coating composition comprises (i) a hydroxyl- and carboxyl-containing resin and (ii) a melamine resin, as curable resin components.

Examples of resins preferably used as the resin (i) include hydroxyl- and carboxyl-containing acrylic resins and polyester resins.

The hydroxyl- and carboxyl-containing acrylic resin can be prepared by copolymerizing a hydroxyl-containing unsaturated monomer, a carboxyl-containing unsaturated monomer, and optionally one or more other vinyl unsaturated monomers. Examples of useful hydroxyl-containing unsaturated monomers are $C_{2-20}$ hydroxyalkyl esters of acrylic or methacrylic acids, such as hydroxyethyl (meth)acrylate, hydroxypropyl (meth)acrylate and hydroxybutyl (meth)acrylate. Example of useful carboxyl-containing unsaturated monomers are monocarboxylic acids such as acrylic acid and methacrylic acid; dicarboxylic acids such as maleic acid, itaconic acid, fumaric acid and mesaconic acid; and anhydrides of the dicarboxylic acids or half-esterified or otherwise modified ones. Examples of vinyl unsaturated monomers optionally used are $C_{1-22}$ alkyl esters of acrylic or methacrylic acids such as methyl (meth)acrylate, ethyl (meth)acrylate, propyl (meth)acrylate, butyl (meth)acrylate and hexyl (meth)acrylate; styrene, acrylonitrile and the like. It is preferable for the acrylic resin to have a number average molecular weight of about 5,000 to about 100,000, particularly about 15,000 to about 80,000. Preferably, the acrylic resin has a hydroxyl value of about 20 to about 200 mg KOH/g, particularly 40 to 150 mg KOH/g. It is preferable for the acrylic resin to have an acid value of about 10 to about 150 mg KOH/g, particularly 20 to 100 mg KOH/g.

The hydroxyl- and carboxyl-containing polyester resin can be produced by esterification reaction between polybasic acid and polyhydric alcohol. Examples of useful polybasic acids are phthalic acid, isophthalic acid, terephthalic acid, succinic acid, adipic acid, azelaic acid, sebacic acid, tetrahydrophthalic acid, hexahydrophthalic acid, HET acid, maleic acid, fumaric acid, itaconic acid, trimellitic acid and anhydrides of these acids. Examples of useful polyhydric alcohols are ethylene glycol, propylene glycol, butylene glycol, hexanediol, diethylene glycol, dipropylene glycol, neopentylglycol, triethyleneglycol, glycerin, trimethylolethane, trimethylolpropane and pentaerythritol. It is preferable for the polyester resin to have a number average molecular weight of about 2,000 to about 100,000, preferably 3,000 to 80,000. Preferably, the polyester resin has a hydroxyl value of about 30 to 120 mg KOH/g, particularly 50 to 80 mg KOH/g. It is preferable for the polyester resin to have an acid value of about 15 to about 100 mg KOH/g, particularly 30 to 50 mg KOH/g.

Resins preferably used as the melamine resin (ii), which is a curing agent, are partially or fully etherified methylol melamine resins prepared by the method described below and having 1 to 5 triazine rings in the molecule and having a molecular weight of about 300 to about 3,000, particularly 500 to 2,000. The method for preparing the partially or fully etherified methylol melamine resin comprises partially or fully methylolating a melamine resin and partially or fully etherifying the methylol groups of the melamine resin using a $C_{1-8}$ alcohol, such as methanol, ethanol, propanol or butanol. The melamine resin may be hydrophobic or hydrophilic.

The aqueous colored base coating composition may contain, in addition to the components (i) and (ii), at least one pigment selected from the group consisting of coloring pigments, metallic pigments and interference pigments. The aqueous colored base coating composition may further contain oxazoline-containing compounds, extenders, organic solvents, catalysts, sedimentation inhibitors, UV absorbers, etc.

In the case of conventional thermosetting powder coating compositions, when surface smoothness of the coating film is improved, other coating properties such as weather resistance, solvent resistance and acid resistance are impaired. On the other hand, when these coating properties are improved, surface smoothness of the coating film is reduced. Therefore, it has been difficult to achieve a proper balance therebetween. When the conventional thermosetting powder coating compositions are used as clear coating compositions in 2-coat 1-bake systems using aqueous base coating compositions, such problems develop to a serious level. Therefore, it has been difficult to form a topcoat that excels in both surface smoothness and the above-mentioned other coating properties.

In contrast to the conventional compositions, the thermosetting powder coating composition of the present invention comprises, in addition to an epoxy-containing resin, a curing agent containing acid anhydride groups and carboxyl groups in specific proportions. The powder coating composition containing such a specific curing agent is cured after being fully melted and flowed and therefore excels in both surface smoothness and other properties of the coating film, even when used as a clear coating composition in 2-coat 1-bake systems using aqueous base coating compositions, thus achieving remarkable effects.

The present invention will be described below in more detail with reference to Preparation Examples, Examples and Comparative Examples, wherein the parts and percentages are all by weight unless otherwise specified.

PREPARATION EXAMPLE 1

Preparation of Epoxy-Containing Resin (A-1) for Powder Coating Composition 60 parts of toluene was placed in a reactor equipped with a thermometer, a thermostat, a stirrer, a condenser and a dropping device, and heated to 105° C. while blowing nitrogen gas thereinto. Added dropwise was a mixture of 15 parts of styrene, 30 parts of methyl methacrylate, 20 parts of iso-butyl methacrylate, 35 parts of glycidyl methacrylate and 4 parts of azobisisobutylonitrile over a period of about 3 hours. After the mixture was allowed to stand at 105° C. for 1 hour, added dropwise was a mixture of 10 parts of toluene and 0.5 part of azobisisobutylonitrile over a period of 1 hour. After completion of addition, the mixture was allowed to stand at 105° C. for 1 hour to complete the copolymerization reaction. Then the solvent was removed from the system under reduced pressure, thus giving an epoxy-containing resin (A-1). The resin had a glass transition temperature of about 54° C. and a number average molecular weight of 3,500.

PREPARATION EXAMPLE 2

Preparation of Epoxy-Containing Resin (A-2) for Powder Coating Composition

An epoxy-containing resin (A-2) was prepared in the same manner as in Preparation Example 1 with the exception of using, as monomers, 15 parts of styrene, 35 parts of methyl methacrylate, 25 parts of iso-butyl methacrylate and 25 parts of glycidyl methacrylate. The resin obtained had a glass transition temperature of about 56° C. and a number average molecular weight of 3,400.

PREPARATION EXAMPLE 3

Preparation of Epoxy-Containing Resin (A-3) for Powder Coating Composition

An epoxy-containing resin (A-3) was prepared in the same manner as in Preparation Example 1 with the exception of using, as monomers, 15 parts of styrene, 30 parts of methyl methacrylate, 18.3 parts of iso-butyl methacrylate, 15 parts of glycidyl methacrylate and 21.7 parts of methylglycidyl methacrylate. The resin obtained had a glass transition temperature of about 50° C. and a number average molecular weight of 3,500.

PREPARATION EXAMPLE 4

Preparation of Acid Anhydride (a-1)

391 parts of dodecanoic diacid and 173.5 parts of acetic anhydride were placed in a reactor equipped with a thermometer, a thermostat, a stirrer and a condenser, and heated to 170° C. with stirring while distilling off acetic acid. After the distillation of acetic acid ceased, pressure was reduced to 30 mmHg at 170° C., followed by cooling the reaction mixture to 100° C. Added dropwise was 6.4 parts of methanol over a period of 1 hour. Further, the esterification reaction was allowed to proceed for 1 hour. Then 173.5 parts of acetic anhydride was added, and the mixture was heated to 170° C. while distilling off acetic acid. After the distillation of acetic acid ceased, pressure was reduced to 30 mmHg at 170° C., followed by cooling the reaction mixture, thus giving an acid anhydride (a-1).

The acid anhydride obtained was solid and had a melting point of 86° C. The acid anhydride was acid anhydride of formula (1) wherein n (polymerization degree) is 15.1 (determined by $^1$H-NMR analysis) and X is $CH_3$—O—CO—$(CH_2)_{10}$—.

PREPARATION EXAMPLE 5

Preparation of Acid Anhydride (a-2)

345 parts of dodecanoic diacid, 31.6 parts of iso-nonanoic acid and 326.4 parts of acetic anhydride were placed in a reactor equipped with a thermometer, a thermostat, a stirrer and a condenser, and heated to 170° C. with stirring while distilling off acetic acid. After the distillation of acetic acid ceased, pressure was reduced to 30 mmHg at 170° C., followed by cooling the reaction mixture, thus giving an acid anhydride (a-2).

The acid anhydride obtained was solid and had a melting point of 85° C. The acid anhydride was acid anhydride of formula (1) wherein n (polymerization degree) is 14.7 (determined by $^1$H-NMR analysis) and X is $(CH_3)_3CH_2CH(CH_3)CH_2$—.

PREPARATION EXAMPLE 6

Preparation of Acid Anhydride (a-3)

100 parts of succinic anhydride and 222 parts of n-butanol were placed in a reactor equipped with a thermometer, a thermostat, a stirrer and a condenser, and allowed to react at 100° C. for 3 hours. Excess n-butanol was distilled off under reduced pressure, thus giving monobutyl succinate with an acid value of 320 mg KOH/g. Then, 34.8 parts of the obtained monobutyl succinate, 345 parts of dodecanoic diacid and 326.4 parts of acetic anhydride were placed in a reactor equipped with a thermometer, a thermostat, a stirrer and a condenser, and heated to 170° C. with stirring while distilling off acetic acid. After the distillation of acetic acid ceased, pressure was reduced to 30 mmHg at 170° C., followed by cooling the reaction mixture, thus giving an acid anhydride (a-3).

The acid anhydride obtained was solid and had a melting point of 85° C. The acid anhydride was acid anhydride of formula (1) wherein n (polymerization degree) is 15.5 (determined by $^1$H-NMR analysis) and X is $C_4H_9$—O—CO—$(CH_2)_2$—.

PREPARATION EXAMPLE 7

Preparation of Acid Anhydride (a-4)

20.1 parts of aminoundecanoic acid and 116.2 parts of butyl acetate were placed in a reactor equipped with a thermometer, a thermostat, a stirrer and a condenser, and allowed to react at 120° C. for 8 hours while azeotropically distilling off butanol. Further, 58.1 parts of butyl acetate was added, and allowed to react at 120° C. for 3 hours. Butanol and excess butyl acetate were distilled off under reduced pressure, thus giving an acetoamidoundecanoic acid. Then, 48.6 parts of the obtained acetoamidoundecanoic acid, 345 parts of dodecanoic diacid and 326.4 parts of acetic anhydride were placed in a reactor equipped with a thermometer, a thermostat, a stirrer and a condenser, and heated to 170° C. with stirring while distilling off acetic acid. After the distillation of acetic acid ceased, pressure was reduced to 30 mmHg at 170° C., followed by cooling the reaction mixture, thus giving an acid anhydride (a-4).

The acid anhydride obtained was solid and had a melting point of 87° C. The acid anhydride was acid anhydride of formula (1) wherein n (polymerization degree) is 14.3 (determined by $^1$H-NMR analysis) and X is $CH_3$—CO—NH—$(CH_2)_{10}$—.

PREPARATION EXAMPLE 8

Preparation of Acid Anhydride (a-5)

184 parts of dodecanoic diacid and 81.6 parts of acetic anhydride were placed in a reactor equipped with a thermometer, a thermostat, a stirrer and a condenser, and heated to 170° C. with stirring while distilling off acetic acid. After the distillation of acetic acid ceased, pressure was reduced to 30 mmHg at 170° C., followed by cooling the reaction mixture to 100° C. Added dropwise was 6.4 parts of methanol over a period of 1 hour. Further, the esterification reaction was allowed to proceed for 1 hour. Then 81.6 parts of acetic anhydride was added, and the mixture was heated to 170° C. while distilling off acetic acid. After the distillation of acetic acid ceased, pressure was reduced to 30 mmHg at 170° C., followed by cooling the reaction mixture, thus giving an acid anhydride (a-5).

The acid anhydride obtained was solid and had a melting point of 80° C. The acid anhydride was acid anhydride of formula (1) wherein n (polymerization degree) is 5.7 (determined by $^1$H-NMR analysis) and X is $CH_3$—O—CO—$(CH_2)_{10}$—.

PREPARATION EXAMPLE 9

Preparation of Acid Anhydride (a-6)

345 parts of dodecanoic diacid, 56.9 parts of stearic acid and 326.4 parts of acetic anhydride were placed in a reactor equipped with a thermometer, a thermostat, a stirrer and a condenser, and heated to 170° C. with stirring while distilling off acetic acid. After the distillation of acetic acid ceased, pressure was reduced to 30 mmHg at 170° C., followed by cooling the reaction mixture, thus giving an acid anhydride (a-6).

The acid anhydride obtained was solid and had a melting point of 85° C. The acid anhydride was acid anhydride of formula (1) wherein n (polymerization degree) is 14.6 (determined by $^1$H-NMR analysis) and X is $CH_3$—$(CH_2)_{16}$—.

PREPARATION EXAMPLE 10

Preparation of Acid Anhydride (b-1)

391 parts of dodecanoic diacid and 173.5 parts of acetic anhydride were placed in a reactor equipped with a thermometer, a thermostat, a stirrer and a condenser, and heated to 170° C. with stirring while distilling off acetic acid. After the distillation of acetic acid ceased, pressure was reduced to 30 mmHg at 170° C., followed by cooling the reaction mixture, thus giving an acid anhydride (b-1).

The acid anhydride obtained was solid and had a melting point of 86° C. The acid anhydride was acid anhydride of formula (2) wherein n (polymerization degree) is 4.0 (determined by $^1$H-NMR analysis) and had carboxyl groups at both ends.

EXAMPLE 1

Preparation of Powder Coating Composition 1 of the Present Invention 100 parts of an epoxy-containing resin (A-1), 25.3 parts of an acid anhydride (a-1), 19.1 parts of an acid anhydride (b-1) and 0.5 part of benzoin (as an antipopping agent) were dry-blended at room temperature using a Henschel mixer. The blend of the components was fused and kneaded in an extruder, cooled, finely ground in a pin disc mill and passed through a 150-mesh sieve, giving a thermosetting powder coating composition of the invention. In this composition, the molar ratio of the total of carboxyl groups and acid anhydride groups in the curing agent (B) consisting of acid anhydrides (a-1) and (b-1) to epoxy groups in the epoxy-containing resin (A-1) was 0.9:1.

EXAMPLES 2–12 AND COMPARATIVE EXAMPLES 1–13

Preparation of Powder Coating Compositions 2–12 of the Present Invention and Comparative Powder Coating Compositions 1–13

Thermosetting powder coating compositions 2–12 of the present invention and comparative thermosetting powder coating compositions 1–13 were prepared in the same manner as in Example 1, blending components in various proportions as shown in Table 1. In the compositions, the molar ratio of the total of carboxyl groups and acid anhydride groups in the curing agent (B) to epoxy groups in the epoxy-containing resin (A) was all 0.9:1.

In Table 1, the amounts of components are expressed in "parts by weight".

TABLE 1

| | Components | Powder coating compositions of the invention | | | | | | | |
|---|---|---|---|---|---|---|---|---|---|
| | | 1 | 2 | 3 | 4 | 5 | 6 | 7 | 8 |
| Epoxy-containing resin (A) | Resin (A-1) | 100 | 100 | 100 | 100 | 100 | 100 | 100 | 100 |
| | Resin (A-2) | | | | | | | | |
| | Resin (A-3) | | | | | | | | |
| Curing agent (B) | Acid anhydride (a-1) | 25.3 | | | | 25.3 | | | |
| | Acid anhydride (a-2) | | 24.1 | | | | 24.1 | | |
| | Acid anhydride (a-3) | | | 24.3 | | | | 24.3 | |
| | Acid anhydride (a-4) | | | | 25.3 | | | | 25.3 |
| | Acid anhydride (a-5) | | | | | | | | |
| | Acid anhydride (a-6) | | | | | | | | |
| | Acid anhydride (b-1) | 19.1 | 19.1 | 19.1 | 19.1 | | | | |
| | Dodecanoic diacid | | | | | 12.8 | 12.8 | 12.8 | 12.8 |
| Antipopping agent | Benzoin | 0.5 | 0.5 | 0.5 | 0.5 | 0.5 | 0.5 | 0.5 | 0.5 |
| Molar ratio of carboxyl groups to acid anhydride groups in curing agent (B) | | 0.18/0.72 (0.25) | 0.18/0.72 (0.25) | 0.18/0.72 (0.25) | 0.18/0.72 (0.25) | 0.45/0.45 (1.0) | 0.45/0.45 (1.0) | 0.45/0.45 (1.0) | 0.45/0.45 (1.0) |
| Proportion of acid anhydride groups of acid anhydride (a) in curing agent (B) (mole %) | | 50 | 50 | 50 | 50 | 50 | 50 | 50 | 50 |

| | Components | Powder coating compositions of the invention | | | | Comparative powder coating compositions | | | |
|---|---|---|---|---|---|---|---|---|---|
| | | 9 | 10 | 11 | 12 | 1 | 2 | 3 | 4 |
| Epoxy-containing resin (A) | Resin (A-1) | 100 | 100 | 100 | 100 | 100 | | | 100 |
| | Resin (A-2) | | | | | | 100 | | |
| | Resin (A-3) | | | | | | | 100 | |
| Curing agent (B) | Acid anhydride (a-1) | 28.1 | 22.5 | 28.1 | 22.5 | | | | |
| | Acid anhydride (a-2) | | | | | | | | |
| | Acid anhydride (a-3) | | | | | | | | |
| | Acid anhydride (a-4) | | | | | | | | |
| | Acid anhydride (a-5) | | | | | | | | |
| | Acid anhydride (a-6) | | | | | | | | |
| | Acid anhydride (b-1) | 17.0 | 21.3 | | | 38.3 | 27.3 | 38.3 | |
| | Dodecanoic diacid | | | 11.4 | 14.2 | | | | 25.5 |
| Antipopping agent | Benzoin | 0.5 | 0.5 | 0.5 | 0.5 | 0.5 | 0.5 | 0.5 | 0.5 |
| Molar ratio of carboxyl groups to acid anhydride groups in curing agent (B) | | 0.16/0.74 (0.216) | 0.2/0.7 (0.286) | 0.4/0.5 (0.8) | 0.5/0.4 (1.25) | 0.36/0.54 (0.667) | 0.36/0.54 (0.667) | 0.36/0.54 (0.667) | 0.9/0 (∞) |
| Proportion of acid anhydride groups of acid anhydride (a) in curing agent (B) (mole %) | | 55.6 | 44.4 | 55.6 | 44.4 | 0 | 0 | 0 | 0 |

| | Components | Comparative powder coating compositions | | | | | | | | |
|---|---|---|---|---|---|---|---|---|---|---|
| | | 5 | 6 | 7 | 8 | 9 | 10 | 11 | 12 | 13 |
| Epoxy-containing resin (A) | Resin (A-1) | | | 100 | 100 | 100 | 100 | 100 | 100 | 100 |
| | Resin (A-2) | 100 | | | | | | | | |
| | Resin (A-3) | | 100 | | | | | | | |
| Curing agent (B) | Acid anhydride (a-1) | | | 39.4 | 11.2 | 39.4 | 11.2 | | | 50.6 |
| | Acid anhydride (a-2) | | | | | | | | | |
| | Acid anhydride (a-3) | | | | | | | | | |
| | Acid anhydride (a-4) | | | | | | | | | |
| | Acid anhydride (a-5) | | | | | | | 27.7 | | |
| | Acid anhydride (a-6) | | | | | | | | 25.8 | |
| | Acid anhydride (b-1) | | | 8.51 | 29.8 | | | 19.1 | 19.1 | |
| | Dodecanoic diacid | 18.2 | 25.5 | | | 5.67 | 19.9 | | | |
| Antipopping agent | Benzoin | 0.5 | 0.5 | 0.5 | 0.5 | 0.5 | 0.5 | 0.5 | 0.5 | 0.5 |
| Molar ratio of carboxyl groups to acid anhydride groups in curing agent (B) | | 0.9/0 (∞) | 0.9/0 (∞) | 0.08/0.82 (0.098) | 0.28/0.62 (0.452) | 0.2/0.7 (0.286) | 0.7/0.2 (3.5) | 0.18/0.72 (0.25) | 0.18/0.72 (0.25) | 0/0.9 (0) |
| Proportion of acid anhydride groups of acid anhydride (a) in curing agent (B) (mole %) | | 0 | 0 | 77.8 | 22.2 | 77.8 | 22.2 | 50 | 50 | 100 |

PREPARATION EXAMPLE 11

Preparation of Aqueous Base Coating Composition (1) Preparation of Aqueous Acrylic Resin (C-1)

70 parts of butyl cellosolve was placed in a reactor equipped with a thermometer, a thermostat, a stirrer, a condenser and a dropping device, and heated to 115° C. while blowing nitrogen gas thereinto. Added dropwise was a mixture of 30 parts of styrene, 15 parts of methyl methacrylate, 16.7 parts of n-butyl acrylate, 20 parts of 2-ethylhexyl acrylate, 12 parts of hydroxyethyl methacrylate, 6.3 parts of acrylic acid and 1 part of azobisisobutylonitrile over a period of about 3 hours. After the mixture was allowed to stand at 115° C. for 1 hour, added dropwise was a mixture of 10 parts of butyl cellosolve and 0.3 part of azobisisobutylonitrile over a period of 1 hour. After completion of addition, the mixture was allowed to stand at 115° C. for 1 hour to complete the copolymerization reaction, giving a carboxyl- and hydroxyl-containing acrylic resin solution with a solids content of 65%. The acrylic resin had an acid value of 50 mg KOH/g, a hydroxyl value of 50 mg KOH/g, a number average molecular weight of 45,000. The carboxyl groups of the acrylic resin was neutralized with an equivalent amount of dimethylaminoethanol and diluted with water, thus giving an acrylic resin (C-1) aqueous solution having a solids content of 55%.

(2) Preparation of Water-Dispersible Polyester Resin (C-2)

35.95 parts of neopentylglycol, 11.68 parts of trimethylolpropane, 25.34 parts of phthalic anhydride and 31.24 parts of adipic acid were placed in a reactor equipped with a thermometer, a thermostat, a stirrer, a Dean-Stark water separator and a condenser. The mixture was heated to 230° C. over a period of 3 hours while distilling off water. A small amount of xylene was added and a reaction was continued under reflux for 5 hours while distilling off water using the water separator. Then 6.57 parts of trimellitic anhydride was added and a reaction was allowed to proceed at 180 C. for 1 hour. Butyl cellosolve was added, giving a carboxyl- and hydroxyl-containing polyester resin solution having a non-volatile content of 70%. The resin obtained had an acid value of 40 mg KOH/g, a hydroxyl value of 80 mg KOH/g, a number average molecular weight of 6,000. The polyester resin solution was neutralized with an equivalent amount of dimethylaminoethanol, followed by addition of deionized water, thus giving a polyester resin (C-2) emulsion having a solids content of 35%.

(3) Melamine Resin (C-3)

A butyl etherified methylol melamine resin "U-Van 28–60" (product of Mitsui Chemicals, Inc., trade name) was used as melamine resin (C-3).

(4) Metallic Pigment

"Alpaste #7680" (product of Toyo Aluminum K.K., trade name) was used as a metallic pigment.

(5) Blue Organic Pigment

"Heliogen Blue L6900" (product of BASF, trade name, Cyanine Blue) was used as a blue organic pigment.

(6) Preparation of Aqueous Base Coating Composition

A thermosetting aqueous colored base coating composition was prepared by mixing and dispersing 45 parts (solid) of the aqueous acrylic resin (C-1), 30 parts (solid) of the water-dispersible polyester resin (C-2), 25 parts of the melamine resin (C-3), 10 parts of the metallic pigment and 2 parts of the blue organic pigment.

EXAMPLES 13–24 AND COMPARATIVE EXAMPLES 14–26

Coated panels I and II were prepared by a method for forming a topcoat according to a 2-coat 2-bake system or a 2-coat 1-bake system as shown below, using thermosetting powder coating compositions of the invention 1–12 obtained in Examples 1–12 and comparative thermosetting powder coating compositions 1–13 obtained in Comparative Examples 1–13 as clear coating compositions.

(1) Preparation of Coated Panel I (Using a Solvent-based Base Coating Composition)

A dull steel panel of 0.8 mm thickness treated by chemical conversion with zinc phosphate was coated with an epoxy-based cationic electrodepositable coating composition by electrocoating to form a coat of about 20 μm thickness (when baked). The coated panel was baked and further coated by air spray coating with an alkyd resin/amino resin solvent-based intercoating surfacer for automobiles to form a coat of about 20 μm thickness (when cured). The coated panel was baked at 140° C. for 20 minutes, wet sanded with #400 sandpaper and dehydrated for drying, giving a test substrate.

"Magicron Basecoat HM-22" (product of Kansai Paint Co., Ltd., a metallic coating composition, trade name) was applied to the test surface to form a coat of about 15 μm thickness (when cured), and cured by baking at 140° C. for about 30 minutes in a dryer. Each powder coating composition prepared above was applied to the base coated substrate by electrostatic coating to form a coat of about 70 μm thickness (when cured). The coat was cured by heating in a dryer at 160° C. for 30 minutes, thus forming a topcoat according to a 2-coat 2-bake system.

(2) Preparation of Coated Panel II (Using an Aqueous Base Coating Composition)

A dull steel panel of 0.8 mm thickness treated by chemical conversion with zinc phosphate was coated with an epoxy-based cationic electrodepositable coating composition by electrocoating to form a coat of about 20 μm thickness (when baked). The coated panel was baked and further coated by air spray coating with an alkyd resin/amino resin solvent-based intercoating surfacer for automobiles to form a coat of about 20 μm thickness (when cured). The coated panel was baked at 140° C. for 30 minutes, wet sanded with #400 sandpaper, dehydrated for drying, and degreased by wiping with petroleum benzine, giving a test substrate.

The thermosetting aqueous colored base coating composition obtained in Preparation Example 11 was adjusted to a viscosity of 45 seconds (Fordcup #4/20° C.), and applied to the test surface by air spray coating to a thickness of 15±3 μm (when cured), followed by drying at 70° C. for 10 minutes. Each powder coating composition prepared above was applied to the uncured coated surface by electrostatic coating to form a coat of about 70 μm thickness (when cured). The coated substrate was heated at 160° C. for 30 minutes to cure the two coats (base coat and clear coat) at the same time, thus forming a topcoat according to a 2-coat 1-bake system.

The topcoats of the multi-layer coat thus formed were tested for finished appearance and coating properties in the following manner. The finished appearance was observed by the naked eye and tested for centerline average surface roughness (Ra), popping, whiteness (IV value) and flip-flop effect. The coating properties were tested for acid resistance, gasoline resistance and xylene resistance. The test methods are shown below.

Finished Appearance of Coat Observed by the Naked Eye:

The appearance of the coat was evaluated for gloss and surface smoothness according to the following criteria;

A: Good appearance

B: Slightly poor appearance

C: Poor appearance.

Centerline Average Surface Roughness Ra:

The centerline average surface roughness Ra ($\mu$m) of the coat was determined using a surface roughness measuring device ("Surfcom", trade name, product of Tokyo Seimitsu Co., Ltd.). The smaller the value is, the higher the surface smoothness is.

Popping:

The surface of the coat was observed by the naked eye and checked for cratering due to foaming, etc. The degrees of cratering were evaluated according to the following criteria;

A: No cratering; exhibiting high surface smoothness

B: Small cratering; exhibiting slightly low surface smoothness

C: Large and many cratering; exhibiting significantly low surface smoothness.

Whiteness (IV Value) and Flip-flop Effect (FF Value):

The IV value and flip-flop effect (FF value) of the coat were determined using "ALCOPELMR-100" (trade name, a product of Fuji Kogyo Co., Ltd.). These measurements demonstrate finished appearance in the following aspects. IV value is an index of whiteness achieved by aluminium flakes in the coating film. The more closely metallic flakes are oriented to be parallel to the coating surface, the whiter the flakes look, thereby achieving a higher IV value. Flip-flop effect (FF value) is a degree of change in brilliancy depending on the angle of view. The more closely metallic flakes are oriented to be parallel to the coating surface, the greater brilliancy varies even with a slight change in the angle of view, thereby achieving a higher FF value.

Acid Resistance:

0.4 ml of a 40% sulfuric acid solution was applied dropwise to the coated panel, followed by heating on a hot plate at 85° C. for 15 minutes. After washing the coated panel with water, the surface of the coated panel was observed by the naked eye and evaluated according to the following criteria;

A: No change; exhibiting high resistance to acid

B: A difference in film thickness between the solution-applied portion and the controlled (unapplied) portion; exhibiting slightly poor resistance to acid C: Blushing on the coating surface; exhibiting poor resistance to acid.

Gasoline Resistance:

The coated panel was immersed in automobile gasoline (JIS K 2202) for 2 hours. The surface of the coat was observed by the naked eye and evaluated according to the following criteria;

A: Free of blisters and blushing; exhibiting good resistance to gasoline

B: Slight blistering or blushing; exhibiting slightly poor resistance to gasoline C: Marked blistering and dulling; exhibiting poor resistance to gasoline.

Xylene Resistance:

0.5 ml of xylene was dropped onto the coated panel, and the coated panel was left to stand at room temperature for 30 minutes. After wiping the xylene off with a gauze, the surface of the coating was observed by the naked eye and evaluated according to the following criteria;

A: No spots; exhibiting good resistance to xylene

B: The outline of spots visually detected; exhibiting poor resistance to xylene

C: Marked swelling on the spots; exhibiting extremely poor resistance to xylene.

Table 2 shows the test results.

TABLE 2

| | | Examples | | | | | | | | | | | |
|---|---|---|---|---|---|---|---|---|---|---|---|---|---|
| | | 13 | 14 | 15 | 16 | 17 | 18 | 19 | 20 | 21 | 22 | 23 | 24 |
| Powder clear coating composition of the invention | | 1 | 2 | 3 | 4 | 5 | 6 | 7 | 8 | 9 | 10 | 11 | 12 |
| Coated Panel I | Finished appearance (by the naked eye) | A | A | A | A | A | A | A | A | A | A | A | A |
| | Ra ($\mu$m) | 0.9 | 1.0 | 0.9 | 0.9 | 1.1 | 1.3 | 1.2 | 1.2 | 0.9 | 1.0 | 1.1 | 1.3 |
| Coated Panel II | Finished appearance (by the naked eye) | A | A | A | A | A | A | A | A | A | A | A | A |
| | Ra ($\mu$m) | 1.1 | 1.2 | 1.1 | 1.0 | 1.3 | 1.5 | 1.3 | 1.4 | 1.1 | 1.2 | 1.3 | 1.5 |
| | Popping | A | A | A | A | A | A | A | A | A | A | A | A |
| | IV value | 282 | 278 | 278 | 279 | 275 | 272 | 274 | 274 | 285 | 277 | 278 | 272 |
| | FF value | 1.69 | 1.67 | 1.68 | 1.68 | 1.65 | 1.64 | 1.65 | 1.65 | 1.69 | 1.64 | 1.66 | 1.64 |
| Coating properties | Acid resistance | A | A | A | A | A | A | A | A | A | A | A | A |
| | Gasoline resistance | A | A | A | A | A | A | A | A | A | A | A | A |
| | Xylene resistance | A | A | A | A | A | A | A | A | A | A | A | A |

| | | Comparative Examples | | | | | | | | | | | | |
|---|---|---|---|---|---|---|---|---|---|---|---|---|---|---|
| | | 14 | 15 | 16 | 17 | 18 | 19 | 20 | 21 | 22 | 23 | 24 | 25 | 26 |
| Comparative powder clear coating composition | | 1 | 2 | 3 | 4 | 5 | 6 | 7 | 8 | 9 | 10 | 11 | 12 | 13 |
| Coated Panel I | Finished appearance (by the naked eye) | B | A | A | B | A | A | A | B | A | B | A | A | A |
| | Ra ($\mu$m) | 1.9 | 1.3 | 1.1 | 3.0 | 1.2 | 1.1 | 0.9 | 1.8 | 1.0 | 2.7 | 0.9 | 0.9 | 1.1 |
| Coated Panel II | Finished appearance (by the naked eye) | C | A | A | C | A | A | A | C | A | C | A | A | A |
| | Ra ($\mu$m) | 3.0 | 1.6 | 1.4 | 4.0 | 1.6 | 1.3 | 1.0 | 2.8 | 1.2 | 3.7 | 1.1 | 1.1 | 1.4 |
| | Popping | C | A | A | C | A | A | A | C | A | C | A | A | A |
| | IV value | 242 | 272 | 275 | 222 | 271 | 280 | 285 | 250 | 280 | 233 | 283 | 282 | 274 |
| | FF value | 1.59 | 1.64 | 1.65 | 1.57 | 1.66 | 1.68 | 1.69 | 1.60 | 1.67 | 1.59 | 1.69 | 1.69 | 1.65 |
| Coating properties | Acid resistance | A | B | A | A | B | A | B | A | B | A | A | A | C |
| | Gasoline resistance | A | B | B | A | B | B | B | A | B | A | B | A | C |
| | Xylene resistance | A | B | C | C | C | C | C | A | C | B | C | C | C |

What is claimed is:

1. A method for forming a topcoat according to a 2-coat 1-bake system comprising the steps of applying to a substrate a thermosetting aqueous colored base coating composition, applying to the uncured surface of the base coat a clear coating composition, and curing the two coats by heating, wherein the clear coating composition is a thermosetting powder coating composition comprising:

(A) an epoxy-containing resin; and
(B) a curing agent containing acid anhydride (a) and at least one species selected from the group consisting of acid anhydride (b) and dibasic acid (c),
the acid anhydride (a) being represented by formula $$X-COO-[CO-(CH_2)_m-COO]_n-CO-X \qquad (1)$$

wherein the two X's are the same or different and independently represent a $C_{4-12}$ alkyl group having a branched structure, $R_1-O-CO-R_2-$, $R_1-CO-R_2-$, or $R_1-CO-NH-R_2-$ in which $R_1$ is a $C_{1-10}$ monovalent saturated hydrocarbon group; $R_2$ is a $C_{1-10}$ bivalent saturated hydrocarbon group; m is an integer of 6 to 18; and n is an integer of 8 to 50,
the acid anhydride (b) being represented by the formula $$HO-[CO-(CH_2)_p-COO]_q-H \qquad (2)$$

wherein p is an integer of 6 to 18 and q is an integer of 2 to 18, and having carboxyl group at both ends,
the dibasic acid (c) being represented by the formula $$HOOC-(CH_2)_t-COOH \qquad (3)$$

wherein t is an integer of 6 to 18,
the molar ratio of carboxyl groups to acid anhydride groups in the curing agent being in the range between 0.15:1 and 2:1,
the molar ratio of the total of carboxyl groups and acid anhydride groups in the curing agent (B) to epoxy groups in the epoxy-containing resin (A) being in the range between 0.7:1 and 1.2:1, and
the molar proportion of acid anhydride groups in acid anhydride (a) to the total of carboxyl groups and acid anhydride groups in the curing agent (B) being 30 to 70 mole %.

* * * * *